July 1, 1941.  C. W. HATFIELD  2,247,881
RIBBON WINDING SPOOL
Filed Oct. 2, 1939
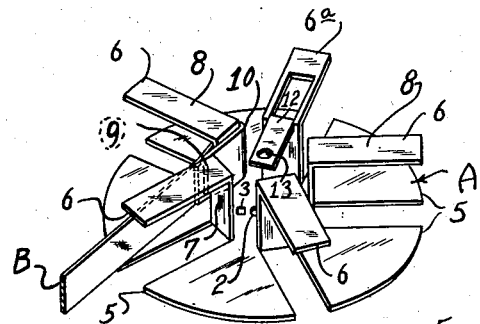
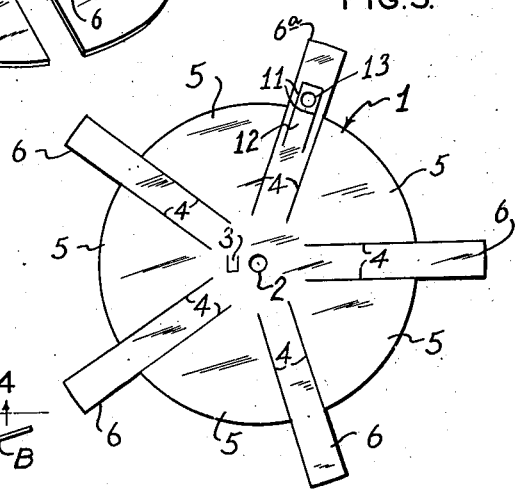
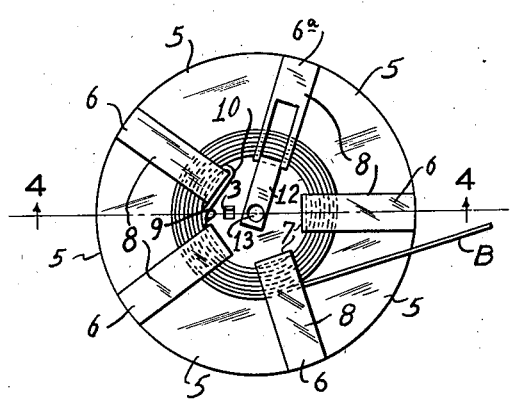
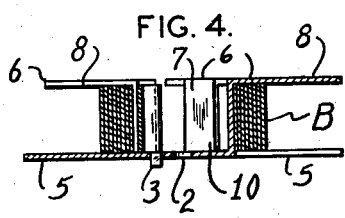
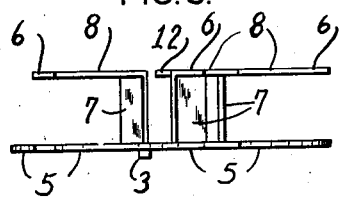
INVENTOR
CHARLES W. HATFIELD
BY
ATTORNEY Patented July 1, 1941

2,247,881

UNITED STATES PATENT OFFICE 2,247,881

RIBBON WINDING SPOOL

Charles W. Hatfield, Glendale, Mo.

Application October 2, 1939, Serial No. 297,516

1 Claim. (Cl. 242—70)

This invention relates to a certain new and useful improvement in winding spools for typewriter ribbons and the like and has for its primary object the provision of a unique ribbon winding spool which is exceedingly simple, inexpensive, economical, rugged, and durable in structure, which may be manufactured quickly and with facility in a single correlated series of operations, thereby effecting substantial savings both as to material and labor, and to and from which the duplicating or other ribbon may be attached and detached for replacement purposes speedily and conveniently and without soiling or staining the hands of the tenegrapher or machine operator.

And with the above and other objects in view, my invention resides in the novel features of form, construction, arrangement, and combination of parts presently described and pointed out in the claim.

In the accompanying drawing—

Figure 1 is a perspective view of a winding spool constructed in accordance with and embodying my present invention;

Figure 2 is a top plan view of the spool;

Figure 3 is a plan view of the spool blank or stamping prior to spool bending and forming operations;

Figure 4 is a transverse sectional view of the spool, taken approximately along the line 4—4, Figure 2; and Figure 5 is a side elevational view of the spool.

Referring now in more detail and by reference characters to the drawing, which illustrates a preferred embodiment of my present invention, the winding spool or reel is preferably stamped or otherwise formed from sheet metal of any suitable size and gauge in the form generally of a flat disk 1 centrally provided with a circular spindle-aperture 2 and an adjacent dog-aperture 3, and having a plurality of circumferentially spaced pairs of radial kerfs 4 subdividing the disk into arcuate segments 5 and tongues 6, which latter extend radially outwardly a substantial distance beyond the disk-circumference or periphery.

The tongues 6 are then each bent upwardly and outwardly in the provision of a hub-section 7 and a spoke-section 8, as best seen in Figures 1 and 2. It will, of course, be evident that the distance by which the tongues 6 project beyond the disk circumference is approximately equal to the axial dimension of the completed spool A, or, in other words, the width of the hub-section 7, and it will also be evident that the disk 1 may be kerfed to provide any convenient or desired number of tongues 6 and segments 5, the resulting so-called spoke-sections 8 forming one wall and the segments 5 forming the other or opposed wall of the finished spool A.

B designates a suitable ribbon, which is formed of ink-impregnated silk or other suitable material, and suitably bent reversely at its free end upon itself and secured by a staple 9 or other securing means in the provision of an end-loop 10, as shown in Figures 1 and 2.

In attaching the ribbon B to the spool A for winding thereon, the loop-equipped end 10 thereof is sidewise inserted over any one of the spoke-sections 8 and slid radially inwardly and then downwardly upon the adjoining hub-section 7, the ribbon B then extending outwardly between the described walls of the spool A for ready winding thereupon in a substantially conventional manner, also as best seen in Figures 2 and 4.

Preferably one of the described tongues, as, for instance, tongue $6^a$, is suitably kerfed and punched, as at 11, to provide an integral strip 12, which is bent inwardly of the spool A to project over an end of the hub thereof, as it may be said, and apertured, as at 13, in registration with the aperture 2 for engaging the machine-spindle and steadying the spool A in ribbon winding and unwinding operations.

Thus, by my present invention, I provide a winding spool which is exceedingly simple, inexpensive, and economical in form and structure, which may be readily and conveniently installed and employed on the machine without any appreciable loss of time and practically with total elimination of soiling of the hands of the machine operator, and which is exceedingly efficient in the performance of its stated functions.

It should be understood that other changes and modifications in the form, construction, arrangement, and combination of the several parts of the duplicating ribbon and spool may be made and substituted for those herein shown and described without departing from the nature and principle of my invention.

Having thus described my invention, what I claim and desire to secure by Letters Patent is:

A unitary winding spool comprising a flat centrally apertured disk having a plurality of uniformly spaced relatively wide radial slots, a flat upstanding hub segment formed integrally with the disk and projecting upwardly at right angles thereto from the inner transverse margin of each slot and integrally provided at its outer extremity with a radial outwardly extending spoke of substantially the same width and length as the slot for registration therewith, said spokes being substantially parallel with the disk and one of said spokes being stamped out in the provision of a reversely bent strip lying substantially in the same plane as the spoke and provided with an aperture positioned for registration with the disk aperture in the provision of an auxiliary spindle-receiving bearing.

CHARLES W. HATFIELD.